(12) United States Patent
Hwang et al.

(10) Patent No.: US 12,397,863 B2
(45) Date of Patent: Aug. 26, 2025

(54) VEHICLE BODY FOR VEHICLE

(71) Applicants: Hyundai Motor Company, Seoul (KR); Kia Corporation, Seoul (KR)

(72) Inventors: Jin Ho Hwang, Cheonan-Si (KR); Dong Eun Cha, Hwaseong-Si (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 409 days.

(21) Appl. No.: 18/075,273

(22) Filed: Dec. 5, 2022

(65) Prior Publication Data

US 2024/0051615 A1 Feb. 15, 2024

(30) Foreign Application Priority Data

Aug. 9, 2022 (KR) .................. 10-2022-0099407

(51) Int. Cl.
*B62D 27/06* (2006.01)
*B62D 63/02* (2006.01)
*B62D 65/04* (2006.01)

(52) U.S. Cl.
CPC .......... *B62D 27/06* (2013.01); *B62D 63/025* (2013.01); *B62D 65/04* (2013.01)

(58) Field of Classification Search
CPC ....... B62D 27/06; B62D 63/025; B62D 65/04

USPC ....................................... 296/193.04
See application file for complete search history.

(56) References Cited

U.S. PATENT DOCUMENTS

| | | | |
|---|---|---|---|
| 6,276,477 B1* | 8/2001 | Ida .................... | B62D 21/10 |
| | | | 296/193.04 |
| 6,896,319 B1 | 5/2005 | Huang et al. | |
| 10,780,930 B1* | 9/2020 | Kentley-Klay | ....... B62B 3/0612 |
| 2021/0245816 A1* | 8/2021 | Hwang ............... | G07C 5/0816 |
| 2022/0297778 A1* | 9/2022 | Moarefi .............. | B62D 63/04 |

FOREIGN PATENT DOCUMENTS

| | | |
|---|---|---|
| JP | 2020-045071 | 3/2020 |
| KR | 10-2336410 | 12/2021 |
| KR | 10-2022-0055893 | 5/2022 |

* cited by examiner

*Primary Examiner* — Joseph D. Pape
(74) *Attorney, Agent, or Firm* — Morgan, Lewis & Bockius LLP

(57) ABSTRACT

A vehicle body for a vehicle, includes a first body, a second body configured to be fitted with the first body, an insertion portion provided on one of the first body and the second body and including an insertion space formed therein, and a fixing portion provided on the other of the first body and the second body and configured to be inserted into the insertion space of the insertion portion, the fixing portion including a magnetic module provided at an end portion of the fixing portion and configured to fix the fitted first and second bodies by use of a magnetic force generated by a change in magnetic circuit.

15 Claims, 4 Drawing Sheets

VEHICLE BODY FOR VEHICLE

CROSS REFERENCE TO RELATED APPLICATION

The present application claims priority to Korean Patent Application No. 10-2022-0099407, filed on Aug. 9, 2022, the entire contents of which is incorporated herein for all purposes by this reference.

BACKGROUND OF THE PRESENT DISCLOSURE

Field of the Present Disclosure

The present disclosure relates to a vehicle body for a vehicle, and more particularly, to a technology for coupling a plurality of bodies that forms a vehicle body.

Description of Related Art

Recently, new mobility visions with new concepts for implementing human-oriented dynamic future cities have been introduced to vehicle industries. One of the future mobility solutions is a purpose-built vehicle (PBV) as a purpose-based mobility vehicle.

The PBV is an environmental-friendly movement solution for providing necessary customized services to an occupant while moving to the destination on the ground. The PBV may set an optimum route for each situation and perform platooning by use of electric vehicle-based, artificial intelligence.

The PBV vehicle includes a life module in which a passenger or a luggage is loaded, and a driving module in which a drive device for a vehicle is disposed. The life module and the driving module are fastened to each other to form a vehicle body.

A vehicle body for a PBV vehicle in the related art has a problem in that it is difficult to couple a plurality of bodies by mechanical coupling, such as welding or bolting, and to decouple the plurality of bodies, which makes it difficult to manage and repair the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle body for a vehicle, which is implemented as a first body and a second body are fitted with each other so that the vehicle body is conveniently disassembled or assembled because the first body and the second body are fixed by a magnetic module in a state in which the first body and the second body are fitted with each other.

Various aspects of the present disclosure are directed to providing a vehicle body for a vehicle, the vehicle body including: a first body; a second body configured to be fitted with the first body; an insertion portion provided on one of the first body and the second body and including an insertion space formed therein; and a fixing portion provided on the other of the first body and the second body and configured to be inserted into the insertion space of the insertion portion, the fixing portion including a magnetic module provided at an end portion of the fixing portion and configured to fix the fitted first and second bodies by use of a magnetic force generated by a change in magnetic circuit.

The fixing portion and the insertion portion may be disposed to correspond to each other at edge portions of the first body and the second body that are coupled to each other.

The magnetic module may be disposed so that the magnetic force is directed in a direction intersecting a direction in which the fixing portion is inserted.

The insertion portion may include a protruding portion protruding from an internal surface of the insertion portion so that the magnetic module is caught by the protruding portion when the magnetic module is fixed to the insertion portion.

The protruding portion may be formed on an internal surface of the vehicle by press forming.

The fixing portion may further include: a hinge unit extending in a direction intersecting the direction in which the fixing portion is inserted; and a link unit rotatably coupled to an end portion of the hinge unit and extending in the direction in which the fixing portion is inserted, and the magnetic module may be disposed at one end portion of the link unit in a direction intersecting the direction in which the link unit extends.

The fixing portion may further include an elastic member connected to the link unit and configured to apply an elastic force in a direction opposite to a direction of the magnetic force of the magnetic module.

The hinge unit may be provided as a pair of hinge units, the link unit may be provided as a pair of link units, the magnetic module may be provided as a pair of magnetic modules, and the pair of hinge units, the pair of link units, and the pair of magnetic modules may be disposed in the direction intersecting the direction in which the fixing portion is inserted.

The fixing portion may further include an elastic member connected to the link unit and configured to apply an elastic force in a direction opposite to a direction of the magnetic force of magnetic module, and the elastic member may connect the pair of link units and apply the elastic force in the direction opposite to the direction of the magnetic force of the magnetic module.

The fixing portion may further include a base unit coupled to the other of the first and second bodies, and the hinge unit may extend from the base unit.

The fixing portion may further include a stepped portion formed to be stepped and configured to come into contact with an end portion of the insertion portion, the stepped portion being configured to restrict the insertion of the fixing portion.

The vehicle body may further include a connector electrically connected to the magnetic module and configured to operate the magnetic module by applying electric current to the magnetic module.

The magnetic module may include: a module main body configured to come into contact with the insertion portion; a coil wound around the module main body; a stationary magnetic element coupled to the module main body; and a rotary magnetic element rotatably coupled to the module main body, the connector may be connected to the coil, a direction of a magnetic field formed by the coil may be changed depending on a flow direction of the electric current of the connector, and the rotary magnetic element may rotate so that the magnetic circuit is changed.

The first body may have a space in which a passenger is accommodated or a luggage is loaded, and the second body may include a driving unit of driving a vehicle and be provided as a pair of second bodies which is coupled to the first body in a forward/rearward direction thereof.

According to the vehicle body for a vehicle according to an exemplary embodiment of the present disclosure, to couple the first and second bodies, the insertion portion is provided on one of the first and second bodies, the fixing portion including the magnetic modules is provided on the other of the first and second bodies, and the fixing portion is inserted into the insertion portion and thus fitted with the insertion portion. Furthermore, the magnetic modules operate in the state in which the fixing portion is fitted with the insertion portion, and the fixing portion and the insertion portion are fixed by the magnetic force. Therefore, it is possible to easily fasten the first and second bodies.

Furthermore, when the magnetic module is controlled to eliminate the magnetic force, the first body and the second body may be easily unfastened so that when the vehicle body is damaged or needs to be replaced, the first body and the second body are uncoupled, and then the vehicle body is repaired or replaced. Therefore, it is possible to improve maintainability of the vehicle body.

Furthermore, the first body has the space in which a passenger is accommodated or a luggage is loaded, and the second body includes the driving unit of driving the vehicle. Furthermore, the second body is provided as a pair of second bodies which may be coupled to the first body in the forward/rearward direction thereof. Therefore, the first body and the second body may be conveniently coupled and decoupled, and the first body and the second body may be freely replaced in accordance with the customer's requirement, improving the marketability of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
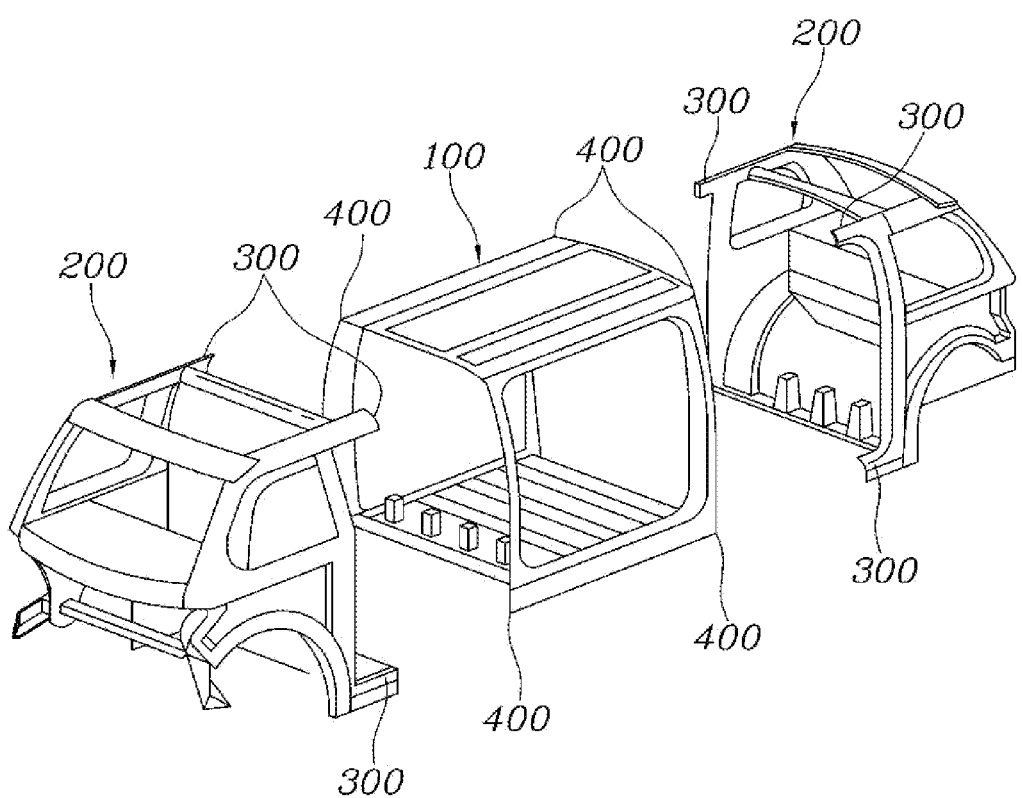
FIG. 1 is a perspective view of a vehicle body for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. The same or similar constituent elements are assigned with the same reference numerals regardless of reference numerals, and the repetitive description thereof will be omitted.

The suffixes 'module', 'unit', 'part', and 'portion' used to describe constituent elements in the following description are used together or interchangeably to facilitate the description, but the suffixes themselves do not have distinguishable meanings or functions.

In the description disclosed in the present specification, the specific descriptions of publicly known related technologies will be omitted when it is determined that the specific descriptions may obscure the subject matter of the exemplary embodiments disclosed in the present specification. Furthermore, it should be understood that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is referred to as being "coupled" or "connected" to another constituent element, it should be understood that one constituent element may be coupled or directly connected to another constituent element, and an intervening constituent element can also be present between the constituent elements. When one constituent element is referred to as being "directly coupled to" or "directly connected to" another constituent element, it may be understood that no intervening constituent element is present between the constituent elements.

Singular expressions include plural expressions unless clearly referred to as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Figure 2:
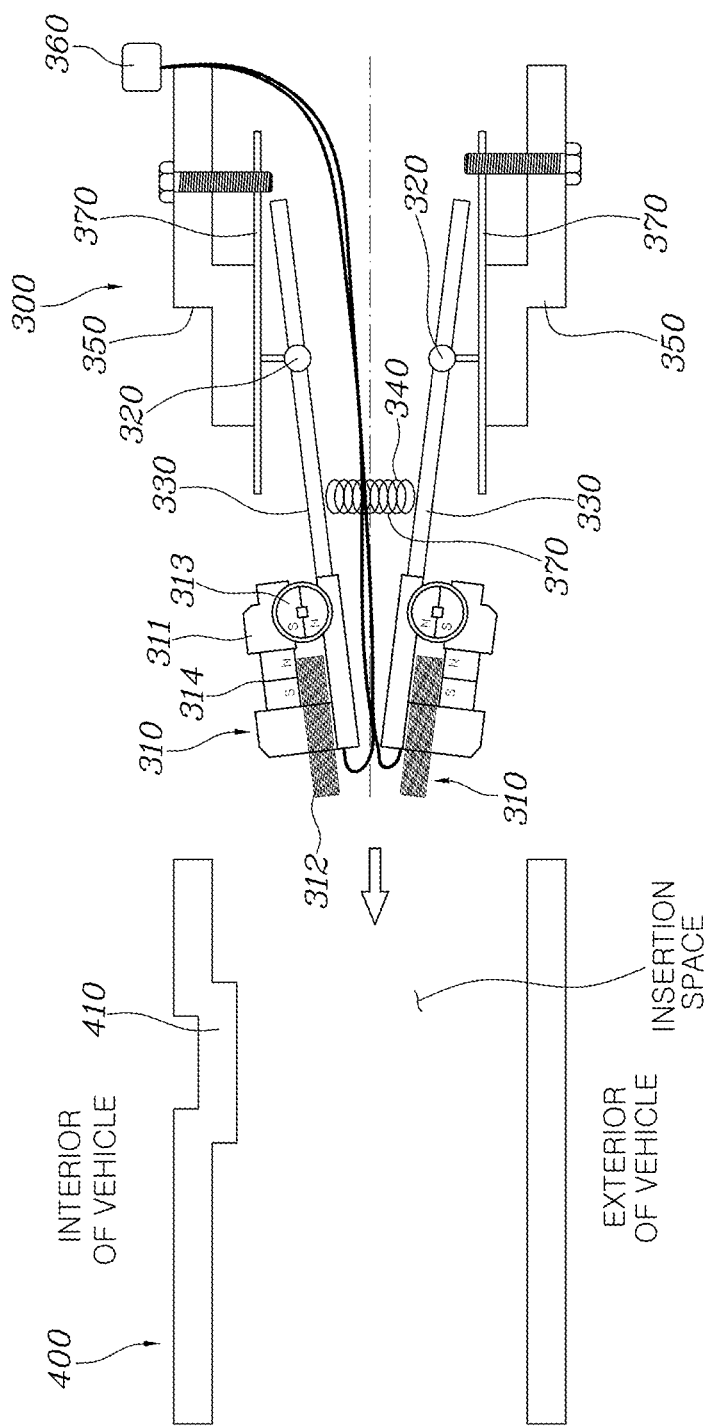
FIG. 2 is a cross-sectional view exemplarily illustrating a state in which an insertion portion and a fixing portion included in the vehicle body for a vehicle according to the exemplary embodiment of the present disclosure are not coupled.
Figure 3:
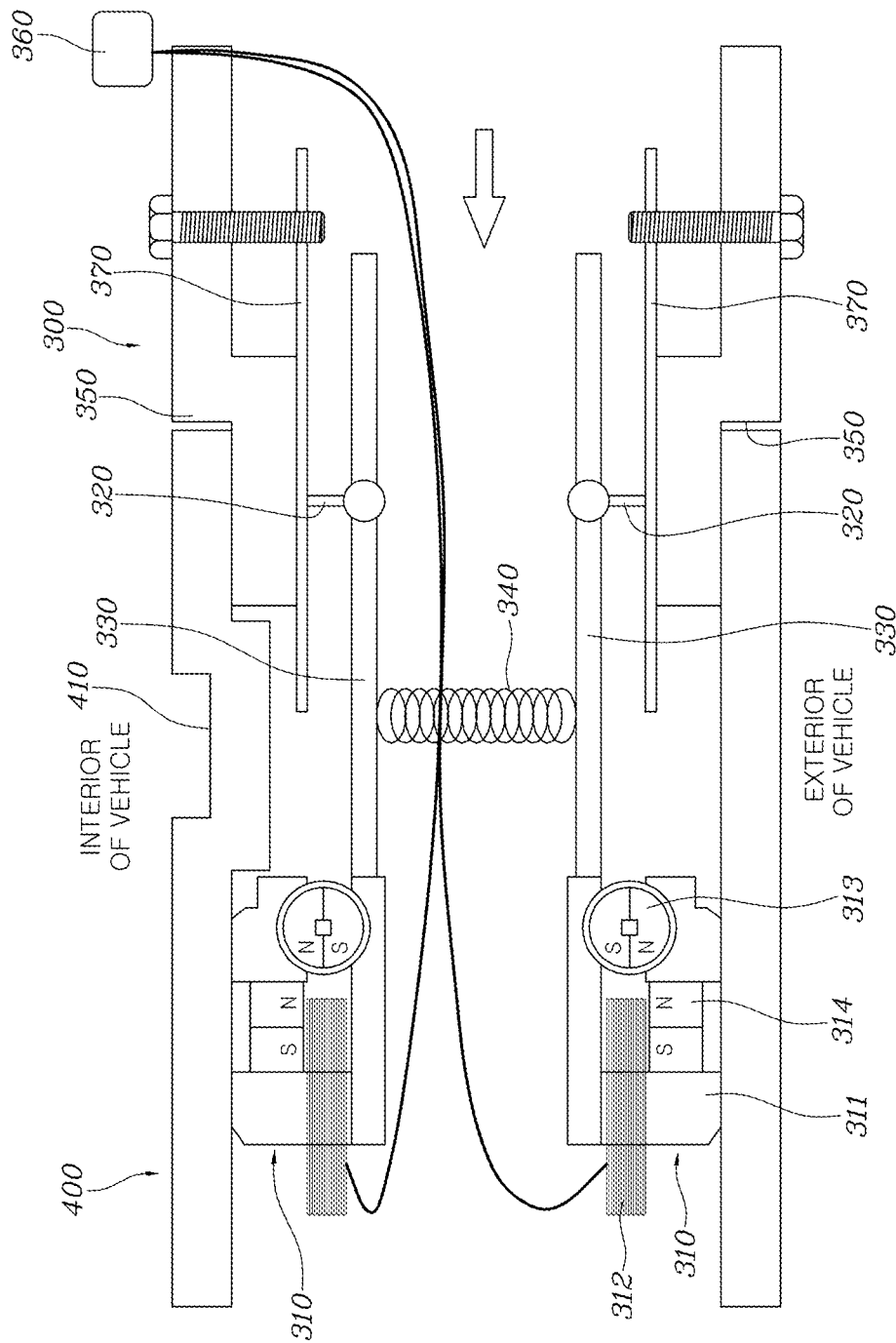
FIG. 3 is a perspective view exemplarily illustrating a state in which the insertion portion and the fixing portion included in the vehicle body for a vehicle according to the exemplary embodiment of the present disclosure are coupled.
Figure 4A:
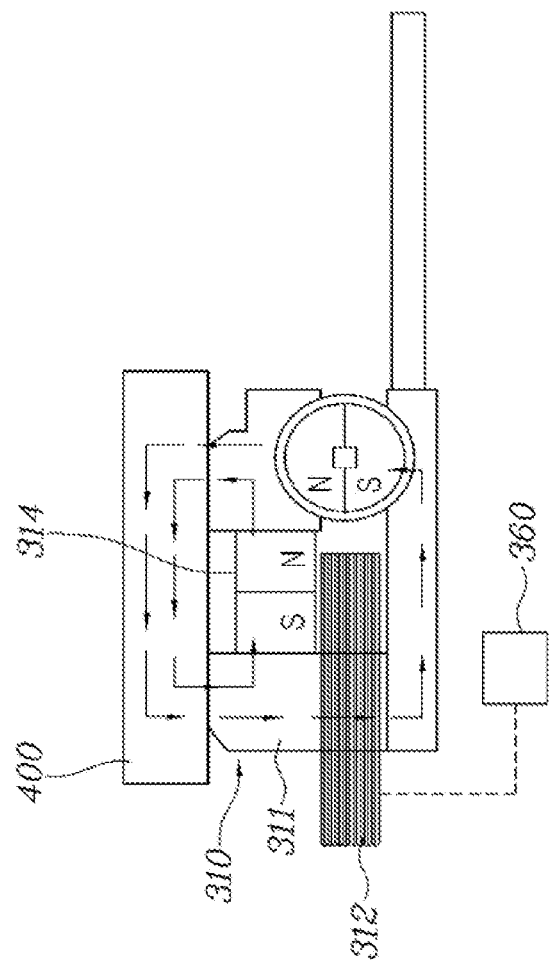
FIG. 4A and FIG. 4B are cross-sectional views exemplarily illustrating an operation of a magnetic module included in the vehicle body for a vehicle according to the exemplary embodiment of the present disclosure.
Figure 4B:
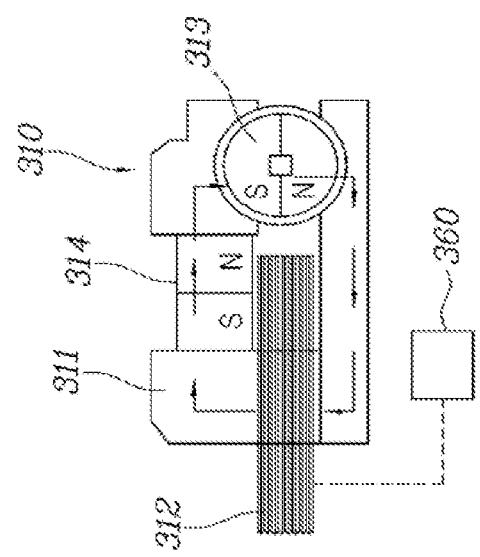

FIG. 1 is a perspective view of a vehicle body for a vehicle according to various exemplary embodiments of the present disclosure, FIG. 2 is a cross-sectional view exemplarily illustrating a state in which an insertion portion and a fixing portion included in the vehicle body for a vehicle according to the exemplary embodiment of the present disclosure are not coupled, FIG. 3 is a perspective view exemplarily illustrating a state in which the insertion portion and the fixing portion included in the vehicle body for a vehicle according to the exemplary embodiment of the present disclosure are coupled, and FIG. 4A and FIG. 4B are cross-sectional views exemplarily illustrating an operation of a magnetic module included in the vehicle body for a vehicle according to the exemplary embodiment of the present disclosure.

An exemplary embodiment of the vehicle body for a vehicle according to an exemplary embodiment of the present disclosure will be described with reference to FIG. 1, FIG. 2, FIG. 3, and FIG. 4A and FIG. 4B.

In the case of a vehicle body generally, a plurality of bodies may be fixed by welding in a state in which the plurality of bodies is coupled, or a plurality of bodies may be fastened by mechanical coupling such as bolting.

This structure makes it difficult to repair the vehicle body and makes it impossible to replace the vehicle body when the vehicle body is broken or a portion of the vehicle body is damaged due to a vehicle accident.

Various embodiments of the present disclosure relates to a vehicle body coupling structure for solving the above-mentioned problem, and various aspects of the present disclosure are directed to providing a configuration in which magnetic modules 310 are applied to fixing portions and coupled to each other so that bodies forming a vehicle body are conveniently coupled or decoupled.

A vehicle body for a vehicle according to various exemplary embodiments of the present disclosure may include a first body 100; second bodies 200 configured to be fitted with the first body 100; insertion portions 400 provided on any one of the first body and the second body 100 and 200 and each including an insertion space formed therein; and fixing portions 300 provided on the other of the first body and the second body 100 and 200 and each configured to be inserted into the insertion space of each of the insertion portions 400, the fixing portions 300 each including magnetic modules 310 provided at an end portion of the fixing portion 300 and configured to fix the fitted first and second bodies 100 and 200 by use of a magnetic force generated by a change in magnetic circuit.

As illustrated in FIG. 1, FIG. 2, and FIG. 3, the first body and the second body 100 and 200 are coupled by being fitted with each other, forming the vehicle body for a vehicle. In the instant case, any one of the first body and the second body 100 and 200 has the insertion portion 400 including the insertion space into which an external object may be inserted. The other of the first body and the second body 100 and 200 has the coupling device configured to be inserted into the insertion space. Therefore, the first body and the second body 100 and 200 are coupled to each other as the coupling device and the insertion portion 400 are fitted with each other so that the vehicle body may be assembled.

The insertion portion 400 may be provided on any one of the first body and the second body 100 and 200. The fixing portion 300 may be provided on the body that does not have the insertion portion 400. The fixing portion 300 may be provided at a position corresponding to the insertion portion 400 and fitted with the insertion portion 400.

In the instant case, the magnetic modules 310 may be provided on the coupling device and generate the magnetic force outward by changing the magnetic circuit. The magnetic modules 310 operate in the state in which the coupling device is fitted with the insertion portion 400 so that the fixing portion 300 and the insertion portion 400 may be fixed to each other in the insertion space.

Therefore, the first body and the second body 100 and 200 may be strongly fixed to each other by the magnetic modules 310 in the state in which the first body and the second body 100 and 200 are fitted with each other. When the first body and the second body 100 and 200 coupled to each other need to be decoupled, as necessary, to repair or replace the first body 100 or the second body 200, the magnetic modules 310 are controlled to easily unfix and separate the first body and the second body 100 and 200 so that the first body 100 or the second body 200 may be conveniently repaired or replaced.

As illustrated in FIG. 1, in the exemplary embodiment of the present disclosure, the first body 100 has a space in which a passenger is accommodated or a luggage is loaded, and the second body 200 includes a driving unit of driving the vehicle. The second body 200 may be provided as a pair of second bodies which may be coupled to the first body 100 in a forward/rearward direction thereof.

In the exemplary embodiment of the present disclosure, the first body 100 may be a life module including a seating space in which a passenger may be accommodated or a loading space in which luggage may be loaded. The second body 200 may be configured as a driving module including the driving unit of the vehicle. The second bodies 200 may be coupled to the first body 100 in the forward/rearward direction and form front and rear driving units of the vehicle.

Therefore, the first body and the second body 100 and 200 are coupled and fixed by the magnetic modules 310, forming the vehicle body for a vehicle. Because the fixing portion 300 and the insertion portion 400 are easily decoupled, the first body 100, which is the life module, or the second body 200, which is the driving module, is easily replaced in accordance with a customer's requirement so that marketability of the vehicle may be improved. Furthermore, because the second body 200, which is the driving module which is more frequently broken down than the life module, may be easily replaced, maintainability of the vehicle may be improved.

The fixing portion 300 and the insertion portion 400 may be provided to correspond to each other at the edge portions of the first body and the second body 200 and 100 that are coupled to each other.

As illustrated in FIG. 1, in the exemplary embodiment of the present disclosure, the insertion portion 400 may be provided on the first body 100, and the fixing portion 300 may be provided on the second body 200 and disposed to correspond to the position of the insertion portion 400.

In the instant case, the insertion portion 400 may be provided as a plurality of insertion portions, the fixing portion is provided as a plurality of fixing portions, and the plurality of insertion portions and the plurality of fixing portions are respectively provided to correspond to one another and disposed at the edge portions of the coupling surfaces of the first body and the second body 100 and 200 so that the first body and the second body 100 and 200 may be securely coupled.

The magnetic modules 310 may be disposed so that the magnetic force is directed in a direction intersecting a direction in which the fixing portion 300 is inserted.

As illustrated in FIG. 2 and FIG. 3, the magnetic modules 310 may be disposed in a direction intersecting the direction in which the fixing portion 300 is inserted. The magnetic modules 310 may be disposed so that the magnetic force is generated in a direction perpendicular to the direction in which the fixing portion 300 is inserted.

Therefore, after the fixing portion 300 is inserted into the insertion space of the insertion portion 400, the magnetic modules 310 are controlled to generate the magnetic force so that the magnetic modules 310 may come into contact with an internal surface of the insertion portion 400 and be immediately coupled by the magnetic force.

In the instant case, the insertion portion 400 may be made of metal, which is a diamagnetic element, so that the insertion portion 400 is fixed by the magnetic force of the magnetic module 310.

A protruding portion 410 may protrude from the internal surface of the insertion portion 400 so that the magnetic module 310 is caught by the protruding portion 410 when the magnetic module 310 is fixed.

As illustrated in FIG. 3, the protruding portion 410 protrudes from the internal surface of the insertion portion 400, and the protruding portion 410 may be disposed outwardly from a position at which the magnetic module 310 is fixed when the fixing portion 300 is inserted into the insertion portion 400.

There may occur a problem in that the magnetic module 310 slides on the internal surface of the insertion portion 400 and the insertion portion 400 and the fixing portion 300 are unfastened even though the magnetic module 310 is fixed to the internal surface of the insertion portion 400 by the magnetic force.

When the magnetic module 310 slides along the internal surface of the insertion portion 400 as described above, the magnetic module 310 is caught by the protruding portion 410 so that the fixing portion 300 may be simultaneously and doubly fixed magnetically and mechanically.

The protruding portion 410 may be formed on an internal surface of the vehicle by press forming.

As illustrated in FIG. 3, the protruding portion 410 protruding inwardly from the internal surface of the insertion portion 400 may be formed by press forming. The protruding portion 410 may be formed on an internal side surface of the vehicle by press forming.

Therefore, an external surface of the vehicle may define an external appearance of the vehicle without including the protruding portion 410. A portion at the internal side of the vehicle, which is recessed when the protruding portion 410 is formed by press forming, may be covered by an internal material provided in the interior of the vehicle.

The fixing portion 300 may further include: hinge units 320 extending in a direction intersecting the direction in which the fixing portion 300 is inserted; and link units 330 rotatably coupled to end portions of the hinge units 320 and extending in the direction in which the fixing portion 300 is inserted. The magnetic module 310 may be disposed at one end portion of the link unit 330. The magnetic modules 310 may be disposed in the direction intersecting the direction in which the link units 330 extend.

As illustrated in FIG. 2 and FIG. 3, the hinge unit 320 may extend in the direction perpendicularly intersecting the direction in which the fixing portion 300 is inserted. The link unit 330 may be rotatably coupled to the end portion of the hinge unit 320 and extend in the direction in which the fixing portion 300 is inserted. The magnetic module 310 may be provided at one end portion of the link unit 330. In the instant case, the magnetic module 310 may be provided to be directed toward the internal surface of the insertion portion 400.

The link unit 330 rotates about a point at which the link unit 330 is connected to the hinge unit 320. Therefore, the magnetic module 310 is spaced from the internal surface of the insertion portion 400 at the time of inserting the fixing portion 300 into the insertion portion 400. When the fixing portion 300 is completely inserted, the magnetic module 310 operates so that the link unit 330 is rotated by the magnetic force, and the magnetic module 310 may be fixed to the internal surface of the insertion portion 400.

Therefore, the magnetic module 310 is not in contact with the internal surface of the insertion portion 400 while the fixing portion 300 is inserted into the insertion portion 400. Therefore, because the magnetic module 310 is not in contact with the internal surface of the insertion portion 400 or the protruding portion 410, the breakdown of or damage to the magnetic module 310 may be prevented, and the fixing portion 300 may be easily inserted.

The fixing portion 300 may further include an elastic member 340 connected to the link unit 330 and configured to apply an elastic force in a direction opposite to the direction of the magnetic force of the magnetic module 310.

The elastic member 340 rotates the link unit 330 by applying the elastic force to the link unit 330 so that the magnetic module 310 is maintained to be spaced from the internal surface of the insertion portion 400. When the magnetic module 310 is controlled to change the magnetic circuit, the magnetic force is generated, and the magnetic force of the magnetic module 310 is higher than the elastic force of the elastic member 340 so that the link unit 330 may rotate as the elastic member 340 is extended, and the magnetic module 310 may be fixed to the internal surface of the insertion portion 400.

Therefore, when the magnetic module 310 is unfixed as the magnetic circuit is controlled, the magnetic module 310 may be moved away from the internal surface of the insertion portion 400 by the elasticity of the elastic member 340 so that the convenience may be improved at the time of separating the fixing portion 300 and the insertion portion 400.

The hinge unit 320 may be provided as a pair of hinge units, the link unit 330 may be provided as a pair of link units, the magnetic module 310 may be provided as a pair of magnetic modules, and the pair of hinge units, the pair of link units, and the pair of magnetic modules may be disposed in the direction intersecting the direction in which the fixing portion 300 is inserted.

As illustrated in FIG. 2 and FIG. 3, the pair of hinge units 320, the pair of link units 330, and the pair of magnetic modules 310, which are included in the fixing portion 300, may be disposed symmetrically in the direction intersecting the direction in which the fixing portion 300 is inserted into the insertion portion 400. When the magnetic module 310 is controlled so that the magnetic circuit is changed, the pair of magnetic modules 310 is fixed to the internal surface of the insertion portion 400 so that the fixing force of the fixing portion 300 may increase.

The fixing portion 300 may further include the elastic member 340 connected to the link units 330 and configured to apply the elastic force in the direction opposite to the direction of the magnetic force of the magnetic modules 310. The elastic member 340 may connect the pair of link units 330 and apply the elastic force in the direction opposite to the direction of the magnetic force of the magnetic module 310.

The elastic member 340 connects the pair of link units 330 and applies the elastic force so that the pair of magnetic modules 310 moves away from the internal surface of the insertion portion 400. When the magnetic modules 310 operate, the magnetic force becomes higher than the elastic force of the elastic member 340 so that the elastic member 340 may be extended, and the magnetic modules 310 may be fixed to the internal surface of the insertion portion 400.

The fixing portion 300 may further include base units 370 coupled to the other side body, and the hinge units 320 extend from the base units 370.

As illustrated in FIG. 2, FIG. 3 and FIG. 4A and FIG. 4B, the hinge unit 320 extends from the base unit 370, and the base unit 370 may be mechanically coupled to the other side body.

Therefore, the magnetic module 310 may be repaired by separating the base unit 370 from the other side body. Alternatively, when the first body and the second body 100 and 200 cannot be separated due to a breakdown in the state in which the magnetic modules 310 are fixed, the base unit 370 may be separated to repair the magnetic module 310 so that maintainability may be improved.

Furthermore, because the magnetic module 310, the hinge unit 320, the link unit 330, and the base unit 370 are manufactured by modularized into a single module, the process of manufacturing the vehicle body may be simplified.

The fixing portion 300 may further include stepped portions 350 formed to be stepped and configured to come into contact with the end portion of the insertion portion 400 to restrict the insertion of the fixing portion 300.

As illustrated in FIG. 2, FIG. 3 and FIG. 4A and FIG. 4B, the stepped portion 350 formed to be stepped to restrict the insertion of the insertion portion 400 is provided at the end portion of the fixing portion 300, and the stepped portion 350 may restrict the insertion of the fixing portion 300. The external surfaces of the first body and the second body 100 and 200 extend because of stepped shapes of the stepped portions 350, defining an external aesthetic appearance.

The fixing portion may further include a connector 360 configured to operate the magnetic modules 310 by applying electric current to the magnetic modules 310.

The connector 360 may be connected to a control unit and a power source unit of the vehicle. The connector 360 may generate the magnetic force by applying the electric current to the magnetic module 310 and changing the magnetic circuit of the magnetic module 310.

The connector 360 may be provided on the other side body including the fixing portion 300 and connected to the magnetic module 310 by wiring.

The magnetic module 310 may include: a module main body 311 configured to come into contact with the insertion portion 400; a coil 312 wound around the module main body 311; a stationary magnetic element 314 coupled to the module main body 311; and a rotary magnetic element 313 rotatably coupled to the module main body 311. The connector 360 is connected to the coil 312. A direction of a magnetic field formed by the coil 312 is changed depending on a flow direction of the electric current of the connector 360, and the rotary magnetic element 313 rotates so that the magnetic circuit may be changed.

As illustrated in FIG. 4A and FIG. 4B, the magnetic module 310 includes: the module main body 311 configured to come into contact with the internal surface of the insertion portion 400; the stationary magnetic element 314 fixedly coupled to the module main body 311; the rotary magnetic element 313 configured to be rotatable; and the coil 312 connected to the connector 360 and configured to be wound around the module main body 311. When the electric current flows through the coil 312, the direction of the magnetic field is changed depending on the flow of electric current so that the rotary magnetic element may rotate.

In FIG. 4B, when the rotary magnetic element 313 rotates so that the magnetic pole of the stationary magnetic element 314 and the magnetic pole adjacent to the magnetic pole of the stationary magnetic element 314 have a same polarity, the magnetic circuit is formed outside the module main body, and the magnetic force is generated so that the module main body may be coupled to an external component by the magnetic force. Furthermore, in FIG. 4A, when the rotary magnetic element 313 rotates so that the magnetic pole of the stationary magnetic element 314 and the magnetic pole adjacent to the magnetic pole of the stationary magnetic element 314 have different polarities, the magnetic circuit is positioned only in the module main body 311 so that the module main body 311 coupled by the magnetic force may be uncoupled.

In the instant case, the electric current, which may rotate the rotary magnetic element 313, may be applied to the coil 312, and the supply of electric current is cut off after the rotary magnetic element 313 is rotated so that the electric power may be effectively used. Therefore, the above-mentioned configuration is more efficient than an electromagnet in the related art.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle body for a vehicle, the vehicle body comprising:
   a first body;
   a second body configured to be fitted with the first body;
   an insertion portion provided on one of the first body and the second body and including an insertion space formed therein; and
   a fixing portion provided on another of the first body and the second body and configured to be inserted into the insertion space of the insertion portion, the fixing portion including a magnetic module provided at an end portion of the fixing portion and configured to fix the fitted first and second bodies by use of a magnetic force generated by a change in magnetic circuit,
   wherein the insertion portion includes a protruding portion protruding from an internal surface of the insertion portion so that the magnetic module is caught by the protruding portion when the magnetic module is fixed to the insertion portion.

2. The vehicle body of claim 1, wherein the fixing portion and the insertion portion are disposed to correspond to each other at edge portions of the first body and the second body that are coupled to each other.

3. The vehicle body of claim 1, wherein the magnetic module is disposed so that the magnetic force is directed in a direction intersecting a direction in which the fixing portion is inserted.

4. The vehicle body of claim 1, wherein the protruding portion is formed on an internal surface of the vehicle by press forming.

5. The vehicle body of claim 3, wherein the fixing portion further includes:
   a hinge unit extending in a direction intersecting the direction in which the fixing portion is inserted; and
   a link unit rotatably coupled to an end portion of the hinge unit and extending in the direction in which the fixing portion is inserted, and
   wherein the magnetic module is disposed at one end portion of the link unit in the direction intersecting the direction in which the link unit extends.

6. The vehicle body of claim 5, wherein the fixing portion further includes an elastic member connected to the link unit and configured to apply an elastic force in a direction opposite in a direction of the magnetic force of the magnetic module.

7. The vehicle body of claim 5, wherein the hinge unit is provided as a pair of hinge units facing each other, the link unit is provided as a pair of link units facing each other, the magnetic module is provided as a pair of magnetic modules facing each other, and the pair of hinge units, the pair of link units, and the pair of magnetic modules are disposed in the direction intersecting the direction in which the fixing portion is inserted.

8. The vehicle body of claim 7, wherein the fixing portion further includes:
   an elastic member connected to the link unit and configured to apply an elastic force in a direction opposite in a direction of the magnetic force of magnetic module, and
   wherein the elastic member connects the pair of link units and applies the elastic force in the direction opposite to the direction of the magnetic force of the magnetic module.

9. The vehicle body of claim 5, wherein the fixing portion further includes:
   a base unit coupled to another one of the first and second bodies, and the hinge unit extends from the base unit.

10. The vehicle body of claim 1, wherein the fixing portion further includes:
    a stepped portion formed to be stepped and configured to come into contact with an end portion of the insertion portion, the stepped portion being configured to restrict the insertion of the fixing portion.

11. The vehicle body of claim 1, further including:
    a connector electrically connected to the magnetic module and configured to operate the magnetic module by applying electric current to the magnetic module.

12. The vehicle body of claim 11, wherein the magnetic module includes:
    a module main body configured to come into contact with the insertion portion;

a coil wound around the module main body;
a stationary magnetic element coupled to the module main body; and
a rotary magnetic element rotatably coupled to the module main body,
wherein the connector is connected to the coil, and
wherein a direction of a magnetic field formed by the coil is changed depending on a flow direction of the electric current of the connector, and the rotary magnetic element rotates so that the magnetic circuit is changed.

13. The vehicle body of claim 1, wherein the first body has a space in which a passenger is accommodated or a luggage is loaded, and the second body includes a driving unit of driving the vehicle and is provided as a pair of second bodies which is coupled to the first body in forward and rearward direction thereof.

14. A vehicle body for a vehicle, the vehicle body comprising:
a first body;
a second body configured to be fitted with the first body;
an insertion portion provided on one of the first body and the second body and including an insertion space formed therein; and
a fixing portion provided on another of the first body and the second body and configured to be inserted into the insertion space of the insertion portion, the fixing portion including a magnetic module provided at an end portion of the fixing portion and configured to fix the fitted first and second bodies by use of a magnetic force generated by a change in magnetic circuit,
wherein the magnetic module is disposed so that the magnetic force is directed in a direction intersecting a direction in which the fixing portion is inserted,
wherein the fixing portion further includes:
 a hinge unit extending in a direction intersecting the direction in which the fixing portion is inserted; and
 a link unit rotatably coupled to an end portion of the hinge unit and extending in the direction in which the fixing portion is inserted, and
wherein the magnetic module is disposed at one end portion of the link unit in the direction intersecting the direction in which the link unit extends.

15. A vehicle body for a vehicle, the vehicle body comprising:
a first body;
a second body configured to be fitted with the first body;
an insertion portion provided on one of the first body and the second body and including an insertion space formed therein;
a fixing portion provided on another of the first body and the second body and configured to be inserted into the insertion space of the insertion portion, the fixing portion including a magnetic module provided at an end portion of the fixing portion and configured to fix the fitted first and second bodies by use of a magnetic force generated by a change in magnetic circuit; and
a connector electrically connected to the magnetic module and configured to operate the magnetic module by applying electric current to the magnetic module,
wherein the magnetic module includes:
a module main body configured to come into contact with the insertion portion;
a coil wound around the module main body;
a stationary magnetic element coupled to the module main body; and
a rotary magnetic element rotatably coupled to the module main body,
wherein the connector is connected to the coil, and
wherein a direction of a magnetic field formed by the coil is changed depending on a flow direction of the electric current of the connector, and the rotary magnetic element rotates so that the magnetic circuit is changed.

\* \* \* \* \*